No. 778,963. PATENTED JAN. 3, 1905.
T. F. GUFFIN.
WHIFFLETREE CLIP AND HOOK.
APPLICATION FILED AUG. 15, 1904.
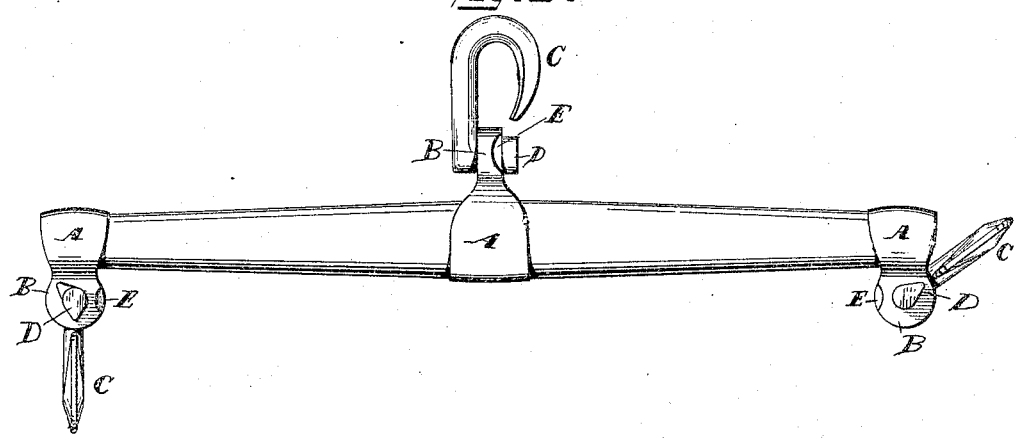
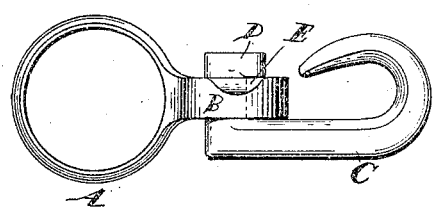
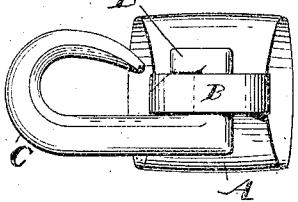
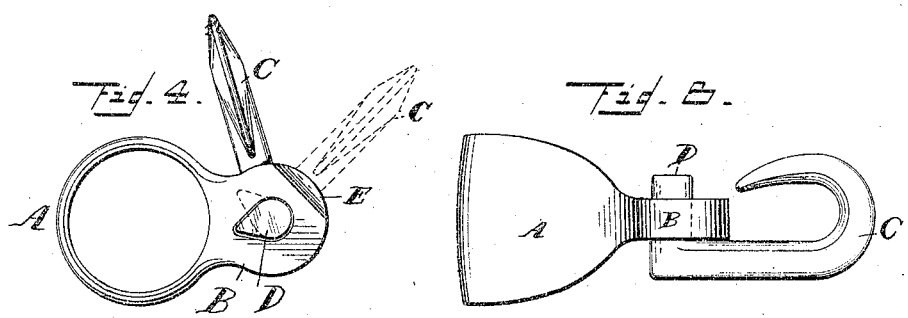
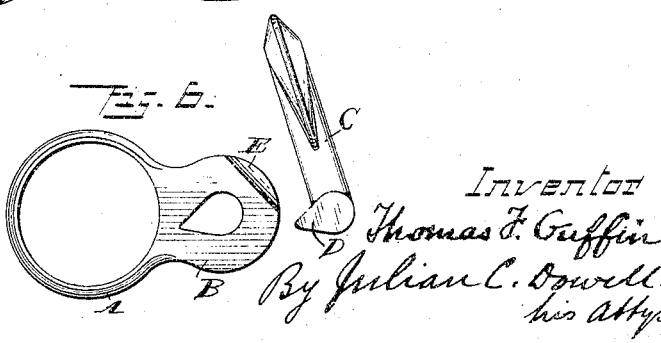

No. 778,963. Patented January 3, 1905.

UNITED STATES PATENT OFFICE.

THOMAS F. GUFFIN, OF CINCINNATI, OHIO, ASSIGNOR OF TWO-THIRDS TO THOMAS HILLGROVE AND JOHN G. O'CONNELL, OF CINCINNATI, OHIO.

WHIFFLETREE CLIP AND HOOK.

SPECIFICATION forming part of Letters Patent No. 778,963, dated January 3, 1905.

Application filed August 15, 1904. Serial No. 220,812.

*To all whom it may concern:*

Be it known that I, THOMAS F. GUFFIN, a citizen of the United States, residing at Cincinnati, in the county of Hamilton and State of Ohio, have invented a certain new and useful Whiffletree Clip and Hook, of which the following is a specification.

This invention relates to whiffletree-hooks, by which is meant either the hooks at the ends of a swingletree for attachment of the traces or the center hook of a doubletree or swingletree for connecting to a plow-clevis, tongue, other whiffletree, or the like.

The invention comprises a clip for permanent attachment to the whiffletree and a hook detachably pivoted thereto.

By means of the improvements herein described the following objects and advantages are attained: First, the hook is readily attachable and detachable without the necessity of removing the clip, while at the same time loose contrivances are avoided and the hook is prevented from accidental detachment; second, perfect swivel motion of the hook is allowed, while the friction and rattling accompanying a loose-fitting device is avoided; third, a trace or chain-link may be conveniently engaged or withdrawn over the hook, while it is insured against slipping off accidentally in use.

In the accompanying drawings, which form a part of this specification, Figure 1 shows a whiffletree provided at the middle and ends with clips and hooks embodying my invention. Fig. 2 is a side view of one of the end clips with the hook in pulling position. Fig. 3 is a front view of the same clip with the hook in position for detachment. Fig. 4 is a side view of the middle clip with the hook in position for detachment and with dotted lines indicating the hook out of such position. Fig. 5 is a top view of the same clip with the hook in pulling position. Fig. 6 is a side view of the same clip with the hook detached.

The only substantial difference between the devices shown in Figs. 2, 3 and Figs. 4, 5, and 6 is that in the former the pintle of the hook is at right angles to the axis of the whiffletree and the lug therefor on the clip parallel with said axis, while in the latter the pintle of the hook is parallel with the axis of the whiffletree and the lug on the clip at right angles to said axis. The former device is shown at the middle of the whiffletree in Fig. 1, while devices of the latter character are represented at the ends, though this arrangement is not essential, but is principally to disclose different embodiments of the invention. Hence the following brief description will answer for both devices, using the same reference-symbols to designate corresponding parts.

The letter A denotes a clip adapted for permanent attachment to the whiffletree, having an apertured lug B to receive the pintle of the hook C. The clip is shown as an integral ring adapted to be shrunk on the whiffletree; but it may be of any appropriate construction and bolted or otherwise secured in place. The pintle extends, preferably, at right angles from the shank of the hook and has at its end an eccentric head or pointed projection D, by means of which the pintle is prevented from dropping out accidentally. The pintle turns freely in the apertured lug B, which is embraced between the shank of the hook and the head or projection D of the pintle, so that a perfect swivel motion is allowed without the rattling and friction accompanying loose-fitting contrivances. The aperture in the lug B is substantially the shape of the head D or is substantially circular, with the exception of a longitudinal V-groove to permit passage of the pointed projection of said head. The projection of the head and the V-groove are so related that when the hook is in place there is no liability or possibility of the pintle accidentally coming out by ordinary movements of the hook; but in order to have the head register with the aperture it is necessary to turn the hook back next to the clip out of working position, as in Fig. 4, for example, or at the right-hand end of Fig. 1. The hook may readily be attached and detached in this way without removing the clip. In case of breakage of a hook it can easily be withdrawn and replaced by another with very little trouble or loss of time. At the right-hand end of Fig. 1 the hook is shown in position for detachment, while at the left-hand end the hook is shown in position for pulling. The hooks at both ends are shown having the projections D of the pintles substantially in line with the hooks, while the V-grooves along the apertures in lugs B are in such position that the hooks have to be turned outward nearly a half-turn in order to detach them.

In Figs. 4, 5, and 6 the projection D extends at right angles from the hooks, and the V-groove is disposed so as to necessitate a similar turn of the hook for detachment. It is obvious that the hooks cannot turn to detaching position during driving of the team, since the traces will hold them in working position. A notch E is shown cut in the shank B, practically opposite the V-groove of the aperture. This notch provides a convenient means for permitting a trace or chain-link to be slipped on or off the hook when in position such as illustrated in dotted lines in Fig. 4; but when the hook is held in position for pulling the lug B will prevent the trace or chain-link from slipping off by accident.

I claim as my invention and desire to secure by Letters Patent of the United States—

1. A whiffletree clip and hook, wherein the hook has a straight shank with a pintle extending at right angles therefrom having a head with a lateral offset, while the clip has a flat lug projecting therefrom having an aperture for said pintle shaped to register with its head and thus permit insertion and withdrawal of said pintle when the hook is turned back out of pulling relation to said clip, the pintle being retained in place in said aperture when the hook is in pulling position by its shank and offset on the pintle which embrace the said lug of the clip between them.

2. A whiffletree clip and hook, wherein the shank of the hook has a pintle swiveled in an apertured lug on the clip and has a lateral offset retaining it in place when the hook is in pulling position but registering with the aperture which is of corresponding shape to permit insertion and withdrawal of the pintle when the hook is turned out of pulling position, the said lug having also a lateral edge notch which permits a trace or chain-link otherwise too large to slip over the hook to be slipped on or off the hook when it is turned out of pulling position with its point opposite said notch.

3. A whiffletree clip and hook, wherein the hook has a pintle swiveled in an apertured lug on said clip and has its point turned back nearly to the edge of said lug, while the lug has a lateral notch to permit a trace or chain-link to be slipped over the hook when turned out of pulling position with its point opposite said notch.

In testimony whereof I affix my signature in presence of two witnesses.

THOS. F. GUFFIN.

Witnesses:
ALBERT D. SHOCKLEY,
CLARENCE RUNK.